United States Patent
Davis (10) Patent No.: US 8,125,558 B2
(45) Date of Patent: Feb. 28, 2012

(54) INTEGRATED IMAGE CAPTURE AND PROJECTION SYSTEM

(75) Inventor: Michael T. Davis, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 430 days.

(21) Appl. No.: 11/956,521

(22) Filed: Dec. 14, 2007

(65) Prior Publication Data

US 2009/0153712 A1 Jun. 18, 2009

(51) Int. Cl.
H04N 5/222 (2006.01)
H04N 5/225 (2006.01)
H04N 5/64 (2006.01)
H04N 9/31 (2006.01)
G02B 27/00 (2006.01)
G03B 19/18 (2006.01)
G03B 21/32 (2006.01)
G03B 21/00 (2006.01)

(52) U.S. Cl. ...... 348/333.1; 348/343; 348/744; 352/138; 396/430

(58) Field of Classification Search ........ 348/333.1, 348/344, 343; 352/138; 396/430
See application file for complete search history.

(56) References Cited

U.S. PATENT DOCUMENTS

| 5,258,844 | A  | * | 11/1993 | Nakayama et al. | 348/333.1 |
| 5,528,297 | A  | * | 6/1996  | Seegert et al.  | 348/333.1 |
| 5,612,736 | A  |   | 3/1997  | Vogeley et al.  |           |
| 6,399,933 | B2 | * | 6/2002  | Zhang et al.    | 250/208.1 |
| 6,680,764 | B2 | * | 1/2004  | Zhang et al.    | 349/116   |
| 6,830,345 | B2 | * | 12/2004 | Kamm et al.     | 353/122   |
| 7,525,538 | B2 |   | 4/2009  | Bathiche        |           |
| 2002/0176015 | A1 | * | 11/2002 | Lichtfuss     | 348/333.1 |
| 2007/0040921 | A1 |   | 2/2007  | Davis et al.  |           |
| 2007/0058143 | A1 | * | 3/2007  | Penn et al.   | 353/102   |
| 2008/0024738 | A1 | * | 1/2008  | Nozaki et al. | 353/101   |
| 2008/0212957 | A1 | * | 9/2008  | Goto et al.   | 396/430   |
| 2010/0316370 | A1 | * | 12/2010 | Goto et al.   | 396/430   |
| 2011/0176797 | A1 | * | 7/2011  | Lu            | 396/430   |
| 2011/0234859 | A1 | * | 9/2011  | Pao           | 348/240.99 |

FOREIGN PATENT DOCUMENTS

| JP | 08146512    | A | * | 6/1996 |
| JP | 2000023068  | A | * | 1/2000 |
| JP | 2005203953  | A | * | 7/2005 |
| JP | 2006180201  | A | * | 7/2006 |

\* cited by examiner

*Primary Examiner* — John Villecco
(74) *Attorney, Agent, or Firm* — Warren L. Franz; Charles A. Brill; Frederick J. Telecky, Jr.

(57) ABSTRACT

An integrated system comprises a light valve and an image sensor for image display and image capture. The image sensor and the light valve share a common dual-function lens by positioning the light valve and image sensor at locations offset from the optical axis of the dual-function lens.

16 Claims, 4 Drawing Sheets

FIG. 9

INTEGRATED IMAGE CAPTURE AND PROJECTION SYSTEM

TECHNICAL FIELD OF THE DISCLOSURE

The technical field of this disclosure relates to the art of image capture systems and image projection systems, and more particularly, to the art of integrated systems with both image capture and image projection capabilities.

BACKGROUND OF THE DISCLOSURE

There has always been a desire for systems with multiple imaging capabilities, such as image capture, image process, and image displaying capabilities. This desire becomes more compelling and ubiquitous especially in a wide range of hand-held or portable devices, such as mobile phones, personal-data-assistant devices (PDAs), PDA phones, smartphones, laptop computers, digital cameras, digital camcorders, and pocket personal computers. For example, as the trend of integrating image capture functions in mobile phones and portable computers grows, the desire for incorporating image display functions in such systems and devices becomes compelling and evident.

However, existing portable and hand-held devices with image capture functions have limited image display capabilities due to their small sizes and size-fixed display panels on which images are displayed. For example, a typical existing high-end PDA has a display panel of around 3.5" or less; and the resolution of the display panel is around Quarter-VGA (320×240) or less. It is obvious that the limited image display capabilities significantly limit applications of these hand-held and portable devices.

Therefore, it is desired for an integrated system having both image capturing and image displaying capabilities; and more preferably having the ability of varying the display size.

SUMMARY

In one example, a system is disclosed herein. The system comprises: an optical element comprising an optical axis; an image sensor comprising an array of pixels optically coupled to the optical element such that an image of an object can be captured by the image sensor through the optical element; a light valve comprising an array of individually addressable pixels that are optical coupled to the optical element such that a light beam from each pixel can be projected on a screen by the optical element so as to form an image on the screen; and wherein the image sensor or the light valve is offset from the optical axis of the lens in capturing an image and displaying an image.

In another example, a system is disclosed which comprises: an optical element; an image sensor comprising an array of pixels optically coupled to the optical element such that an image of an object can be captured by the image sensor through the optical element; a light valve comprising an array of individually addressable pixels that are optical coupled to the optical element such that a light beam from each pixel can be projected on a screen by the optical element so as to form an image on the screen; and wherein a center of the pixel array of the image sensor is substantially fixed relative to a center of the pixel array of the light valve in the system.

In yet another example, a method of using a system that comprises an array of individually addressable pixels of a light valve, an image sensor, and an optical element is disclosed. The method comprises: at a first time, taking an image of a target object by aligning a camera optical axis defined by the optical element and the image sensor to the target object; at a second time, displaying an image on a screen by projecting light from the light valve pixels on the screen through the optical element along the a display axis; and wherein the display axis and camera axis are not coaxial to the optical axis of the optical element.

In yet another example, a system is disclosed which comprises: an optical element; an imaging means for capturing an image of an object through the optical element, wherein said image means defines a first optical axis on which the optical element is disposed; an image projecting means for projecting an image onto a screen through the optical element, wherein said image projecting means defines a second optical axis on which the optical element is disposed; and wherein said first and second optical axes are substantially not coincident.

BRIEF DESCRIPTION OF DRAWINGS

FIG. 3b schematically illustrates a cross-sectional view of the spatial light modulator as illustrated in FIG. 3a;

DETAILED DESCRIPTION OF SELECTED EXAMPLES

In view of the foregoing, disclosed herein is a system integrated therein at least an image capture function and an image display function. The image capturing function enables the system to capture images, which can be static or video image frames. The captured images, as well as other images not captured by the image capturing capability, can be displayed by the image display function of the system. The image display function is capable of projecting images such that the projected images can have different sizes.

For reducing the cost and/or size of the integrated system, a dual-function lens can be provided and operated as the object lens for the image capture function and the projection lens for the image display function. In an exemplary optical configuration, the image sensor of the image capture function and the light valve of the image display function are disposed on the opposite sides of the principal optical axis of the dual-function lens. Specifically the optical axis (hereafter "projection axis") of the image display function that comprises the light valve and the dual-function lens is substantially not coincident to the optical axis (hereafter "camera axis") of the image capture function that comprises the image sensor and the dual-function lens. With such optical configuration, image capture function and image display function share the same dual-function lens, which reduces the cost, size, design, and fabrication of the integrated system.

In the following, the integrated system of this disclosure will be discussed with reference to particular examples. It will be appreciated by those skilled in the art that the following discussion is for demonstration purpose, and should not be interpreted as a limitation. Other variations within the scope of this disclosure are also applicable.

Figure 1:
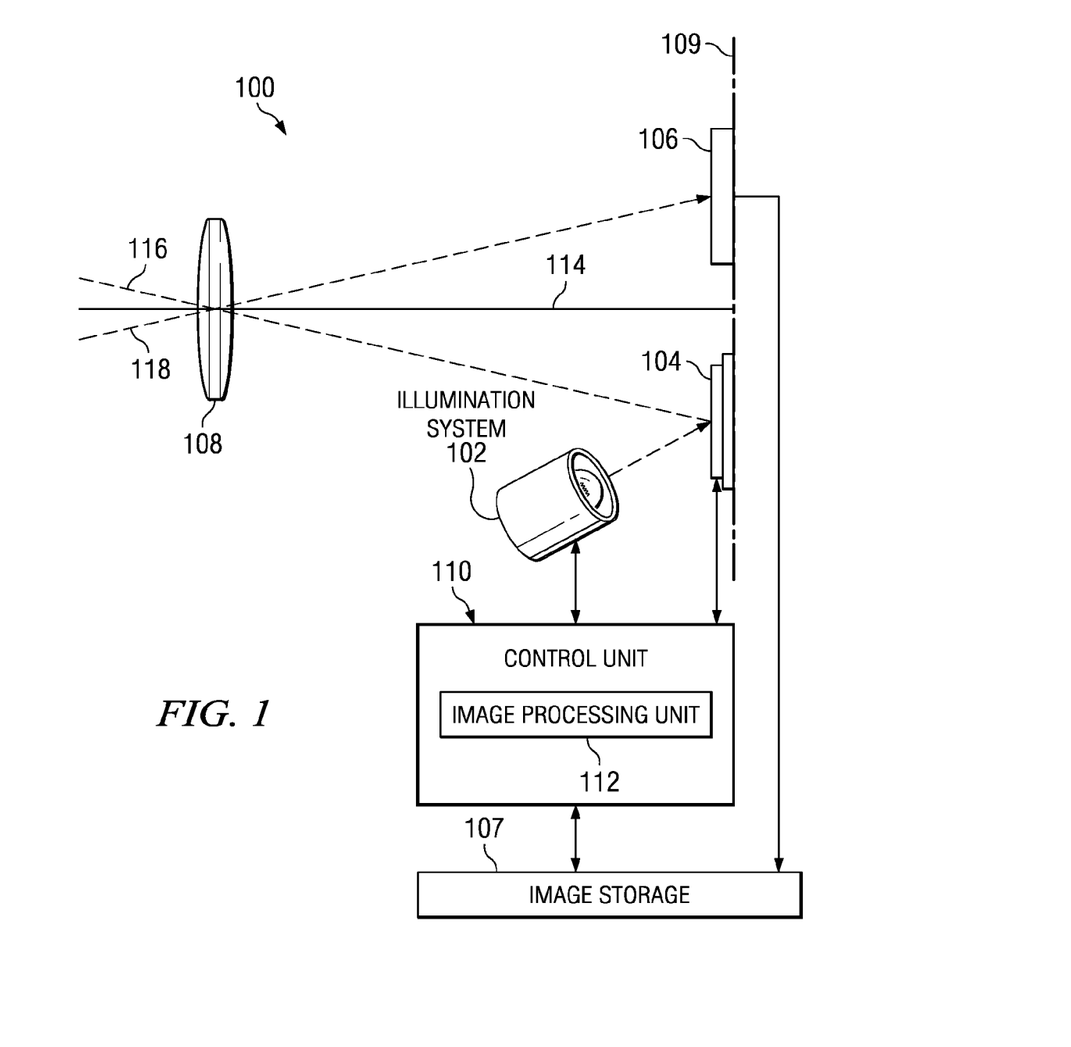
FIG. 1 schematically illustrates an exemplary integrated system with at least image capture and image projection capabilities.

Referring to the drawings, FIG. 1 schematically illustrates an exemplary integrated system (100) comprising an image capture function and an image projection function. The image capture function is accomplished by multiple image capturing components that comprise dual-function lens 108, image capture sensor 106, and other suitable image capture components (e.g. image storage 107, optical shutter, and image storage) that are not illustrated for simplicity. The image display function is accomplished by multiple image display components that comprise dual-function lens 108 and light valve 104. As an optional feature, illumination system 102 and control unit 110 that further comprises image processing unit 112 can be provided for respectively providing illumination light and controlling operations of the image display components and/or image capture components.

The image sensor (106) is provided for capturing images of target objects; and the light valve (104) is provided for projecting images onto a screen. In one example, image sensor 106 and light valve 104 can be disposed at substantially fixed positions relative to the principal optical axis (114) of dual-function lens 108; and share the dual-function lens (108) for both capturing images and projecting images. In another example, image sensor 106 and light valve 104 can be disposed at substantially fixed positions relative to the dual-function projection lens (108); and share the dual-function lens (108) for both capturing images and projecting images. In yet another example, the geometric centers of the dual-function lens, the array of pixels of the light valve, and the array of the image sensor form a triangle or a line. The shape of the triangle can be substantially fixed in the integrated system, even though the dual-function lens, the image sensor, and the light valve each may rotate around their respective centers. It is noted that the dual-function projection lens may comprise a set of optical elements such that the projection lens has capabilities, such as zooming and/or focusing, of obtaining satisfactory image qualities during image capturing and/or image projecting. This can be achieved by adjusting the optical elements of the dual-projection lens (108). Nevertheless, it is preferred that the focus plane (109) of the dual-function lens (108) is substantially at a fixed position within the system (100); and does not change during image capturing and/or image producing operations.

In the example as illustrated in FIG. 1, the light valve and image sensor are disposed at the same side of the dual-function lens (108), but on the opposite sides of the principal optical axis (114) of the dual-function lens (108). Specifically, the image sensor and the light valve can be disposed substantially on a focal plane (109) of dual-function lens 108. Either one or both of the image sensor and light valve can alternatively be disposed at locations away from the focal plane (109) of the dual-function lens. In these instances wherein the image sensor and/or the light valve are disposed away from the focal plane (109), the distance between the light valve and focal plane (109) or the distance between the image sensor and the focal plane (109) is desired to be within the maximum adjustable focal length of the dual-function lens such that the target object can be clearly imaged onto the image sensor; and the light valve can be clearly imaged on a screen. It is noted that regardless of different possible positions, the pixel arrays of the image sensor and/or the pixel array of the light valve may or may not be parallel to the focal plane (109) of the dual-function lens. For example, the image sensor (106) can be tilted away from focal plane 109 such that the pixel array of the image sensor is substantially perpendicular to optical axis 118; while the light valve 104 can be positioned such that the light from light valve pixels at a specific operation state (e.g. ON-state) propagates toward the dual-function lens along optical axis 116 (hereafter "display axis"), which will be discussed in the following.

The camera optical axis (optical axis 118) can be defined as a straight virtual line connecting the center of the pixel array of image sensor (106) and the center (or a static portion) of dual-functional lens 108. During the image capture mode, camera optical axis 118 can be aligned to the target object to be imaged for causing an image of the target object at the image sensor. The display optical axis (116) can be defined by as virtual line connecting the center of the pixel array of light valve 104 and the center of dual-function lens 108. The display optical axis can be the axis along which the light from light valve pixels at a particular state (e.g. the ON-state) propagates toward the dual-function lens. Because the centers of the pixel array of the light valve and the center of the pixel array of light valve are not at optical axis 114 of dual-function lens 108, the display optical axis (116) and the camera optical axis (118) may not be parallel to the optical axis (114) of the dual-function lens (108), but have angle $\theta_{cam}$ between the camera optical axis (118) and optical axis 114 and angle $\theta_{display}$ between the display optical axis (118) and optical axis 114, as illustrated in FIG. 1.

It is noted that even shown in FIG. 1 that the light valve (104) and the image sensor (106) are offset from the principal optical axis (114) of dual-function lens 108, this is one of many possible examples. In other examples, one of the image sensor (106) and the light valve (104) can be placed substantially on the principal optical axis (114) of dual-function lens 108, and the other one is offset from the principal optical axis (114) of the dual-function lens (108). For example, when the image sensor is substantially smaller than the light valve so that the display (the light valve) is centered at the lens axis but the camera (image sensor) is offset to one side of the display, yet still be encompassed entirely within the circular image field of the lens.

For efficiently utilizing the area of the dual-function lens (108) with an optimal size without sacrificing image capturing and/or image displaying performance, the image sensor (106) and light valve 104 can be disposed as closely as possible in the focal plane (109). In one example, the image sensor and the light valve can be disposed side-by-side, or corner-by-corner at the opposite sides of optical axis 114. In other examples wherein the light valve and image sensor are not contacted, the image sensor and light valve can be disposed such that the angle $\theta_{cam}$ and $\theta_{display}$ each can be any suitable values, such as 70° or less, 60° degrees or less, 30° or less, and 20° or less, and 0° degree.

In other examples, additional optical components, such as holographic or non-holographic optical components, can be disposed at the display optical axis (116) between the dual-function lens 108 and the light valve, and/or at the camera optical axis (118) between the dual-function lens and image sensor. With such additional optical elements, the image sensor and/or the light valve can be disposed at any suitable locations. For example, a beam deflector can be disposed at display optical axis 116 between the dual-function lens and the light valve. In the display mode, the light from light valve pixels is directed toward the beam deflector along the first direction; and is deflected toward the dual-function lens along the second direction, wherein the first and second directions are not parallel. In particular, the beam deflector can be a diffractive beam deflector, such as a holographic beam deflector, especially when phase-coherent illumination light illuminators, such as light from many solid-state illuminators (e.g. lasers and light-emitting diodes LEDs), are employed for the display function in the integrated system.

The dual-function lens (108) can be any suitable object lens or projection lens used in existing image capture systems (or devices) or image display systems (or devices), such as cameras (e.g. webcams), camcorders, camera/camcorder embedded systems/devices (e.g. mobile phones and PDAs with embedded cameras/camcorders, and laptop computers with embedded cameras/camcorders), and portable projectors. Selection of the dual-function lens in a specific integrated system can be made depending upon applications, cost, and other factors of the integrated system, such as mobility of the integrated system, size, weight, and compatibility to other optical/non-optical components of the integrated system. For improved performance, the dual-function lens can be used with other optical components so as to form a dual-function lens assembly. For example, the additional optical components can be chromatic correction lens, geometric distortion correction lens, and anti-reflection films, and anti-glaring films.

For enabling projection of images on screens located positioned at different distances from the integrated system (i.e. from the dual-function lens), a focusing mechanism can be coupled or integrated with the dual-function lens (108) for dynamically adjusting the focus or focal plane of the dual-function lens. Specifically, the focusing mechanism is capable of adjusting the focus of the dual-function lens such that light from the light valve (104) along optical path 116 (projection optical axis) can be substantially focused onto screens located at different distances from the dual-function lens when the integrated system is operated at a display mode. In the image capture mode, the focusing mechanism is capable of adjusting the focal plane of the dual-function lens such that light from the target object, for which an image is to be taken, can be focused onto the image sensor (106) along a different optical path 118 (camera optical axis). The focusing mechanism can be configured such that focusing the dual-function lens can be performed automatically and/or manually for either system operation mode. The automatic focusing can be accomplished by using many existing auto-focusing techniques in cameras/camcorders, camera/camcorder embedded devices, or projectors. For example, an image capture loop that comprises the focusing mechanism, the image sensor and/or an image quality analysis device of the integrated system can be established. With such image capture loop, quality of the image on the image sensor can be analyzed. Based on the analyzed quality, the focusing mechanism adjusts the focus of the dual-function lens appropriately.

Image sensor 106 comprises an array of image pixels, and can be any suitable image sensing devices and mediums, such as charge-coupled-devices (CCDs), CMOS image sensors, and standard films (though less preferred), for converting the light from the target object to be imaged into proper formats depending on the nature of the image sensor. For example, when the image sensor is a CCD, the light from the target object is converted into electronic signals that are further converted into viewable or displayable images (e.g. digital images). Such captured images can be delivered to an image-storage (107) of the integrated system.

Light valve 104 comprises an array of individually addressable pixels. Each pixel is capable of being operated at a digital mode or an analog mode. At the digital mode, each pixel has an ON-state and an OFF-state. The light from the pixels at the ON-state is projected to the screen by the dual-function lens (108) so as to cause "bright" image pixels on the screen. At the OFF-state, either there is substantially no light from the pixels at the OFF-state or the light from the pixels is not collected by the dual-function lens (108) so as to cause "dark" image pixels on the screen.

The light valve can be a wide range of devices comprising an array of individually addressable pixels, such as spatial light modulators (e.g. micromirror-based spatial light modulators, liquid-crystal display panels (LCD), liquid-crystal-on-silicon (LCOS) panels, and silicon crystal reflective display panels etc.) and other types of light valves, such as self-light emitting light valves (e.g. organic light-emitting diode displays and plasma panels). Examples of micromirror-based spatial light modulators will be discussed afterwards with reference to FIG. 3a and FIG. 3b. Depending upon different applications, costs, and other factors, the light valve may have any suitable resolutions with the resolution being defined as the total number of pixels of the light valve. For example, the light valve may have a resolution of 320×240 (Quarter-VGA), 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher. Of course, other resolutions are also applicable.

When the light valve is a spatial light modulator, illumination system 102 can be provided for providing illumination light for the light valve. The illumination system comprises one or more illuminators of any suitable types, such as solid-state illuminators (e.g. lasers and LEDs), wavelength specific plasmas, conventional incandescent lamps or halogen lamps, and arc lamps. In one example, the illumination system comprises a set of solid-state illuminators due to their compact size, greater durability, longer operating life, and lower power consumption, as compared to traditional illuminators, such as arc lamps. In particular, the illumination system may comprise a set of solid-state illuminators capable of emitting light of different colors (light with different characteristic wavelengths) that are preferably selected from red, green, blue, yellow, cyan, magenta, and white.

Using solid-state illuminators also benefits reduction of system size and costs, simplification of system design, and many other aspects of the integrated system. This arises from the fact that the light emitted from most current solid-state illuminators is highly collimated and phase-coherent. Phase-coherency enables applications of diffractive optical components, such as holographic optical elements (HOE). A diffractive optical component, especially a holographic optical element, can replace an optical system with a number of optical components, such as lenses, mirrors, beam splitters, beam combiners, optical filters, and prisms. Using holographic optical elements with phase-coherent illumination light and light valves enables more compact and portable imaging systems than traditional imaging systems. Due to their compact sizes, which are often in forms of thin films or thin plates, diffractive optical components can be integrated with the light valve to form a light valve assembly; and such light valve assembly can be directly assembled to the electronic print-board on which other functional modules, such as dedicated electronic chips and electronic connections are located. As a way of example, FIG. 2 schematically illustrates an exemplary illumination system having laser as illuminators.

Figure 2:
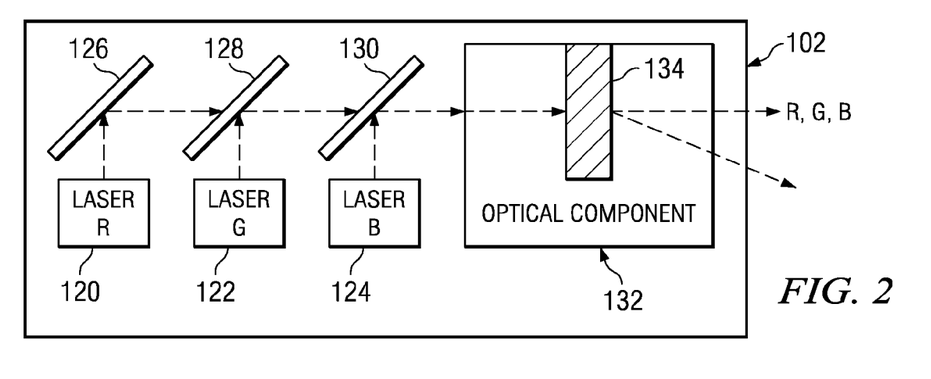
FIG. 2 schematically illustrates an exemplary illumination system for use in the integrated system as illustrated in FIG. 1 for providing illumination light.

Referring to FIG. 2, illumination system 102 comprises laser R 120, laser G 122, and laser B 124 respectively for providing red, green, and blue colors of laser beams. The red, green, and blue laser beams can be directed to the light valve along different optical paths, or along the same optical path as shown in FIG. 2. Specifically, red filter 126 capable of reflecting red color laser beams is disposed such that the reflected red laser beams from laser R 120 propagates towards green filter 128 and blue filter 130. Green filter 128 passes the red laser beams from red filter 126 and reflects the green laser beams from laser G 122 toward blue filter 130. Blue filter 130 passes red and green laser beams incident thereto and reflects the blue laser beam from laser B 124. As such, the red, green, and blue laser beams can be combined together. The combined red, green, and blue laser beams can be directed to optical component 132 for adjusting the profile(s) of the combined light beams or individual light beams or a combination of the individual laser beams. For example, the optical component (132) may comprise beam deflector 134, which can be a diffractive beam deflector (e.g. a holographic beam deflector) or a non-diffractive beam deflector, for deflecting the light beams into a desired propagation direction, as illustrated in FIG. 2. With the beam deflector, the illumination system can be disposed at any suitable locations within the integrated system. The optical component (132) may comprise other types of optical elements, such as light beam re-shaping elements, for improving the performance of the display function.

Referring again to FIG. 1, control unit 110 can be provided for controlling operations of the integrated system. For example, the control unit can be provided with a functional module for switching the integrated system between the image display mode, the image capturing mode, and other operation modes, such as voice connection mode, system configuration/management mode, entertaining mode, word processing mode, if provided with the integrated system. A voice connection mode can be a mode wherein a voice connection is established between multiple participants such that voice communications are enabled between/among the multiple participants. The voice connection may also be coupled with video connections such that images can be shared/transmitted through the established connections. A system configuration/management mode is a mode wherein a system user can configure and/or manage and/or maintain the integrated system. An entertaining mode can be a mode at which the user can play games, listen to music, surfing the internet, and watch videos and images.

The control unit can also be provided to synchronize operations of the illumination system (if provided) and the light valve. The control unit may comprise image processing unit 112 that is dedicated for preparing image data for the light valve. Specifically, the image processing unit is capable of deriving bitplane data from images retrieved from the image storage (107) and/or external image sources. It is noted that image retrieval can be accomplished in many ways, such as through cable connections and wireless connection of varieties of protocols and formats.

It is noted that based on different applications, the integrated system as illustrated in FIG. 1 can be configured into a wide range of systems or devices, such as hand-held or portable devices, such as mobile phones, personal-data-assistant devices (PDAs), PDA phones, smartphones, digital cameras and camcorders, and pocket personal-computers. For simplicity and demonstration purposes, not all functional modules or components of the integrated system configured for a specific application are illustrated in FIG. 1. However, it will be appreciated by those skilled in the art, that many other components and/or functional modules (suitable for an integrated system and configured for a specific application) can be included.

As afore discussed, the light valve can be any suitable devices comprising an array of individually addressable pixels. In one example, FIG. 3a and FIG. 3b schematically illustrate a light valve, which is a micromirror-based spatial light modulator.

Figure 3A:
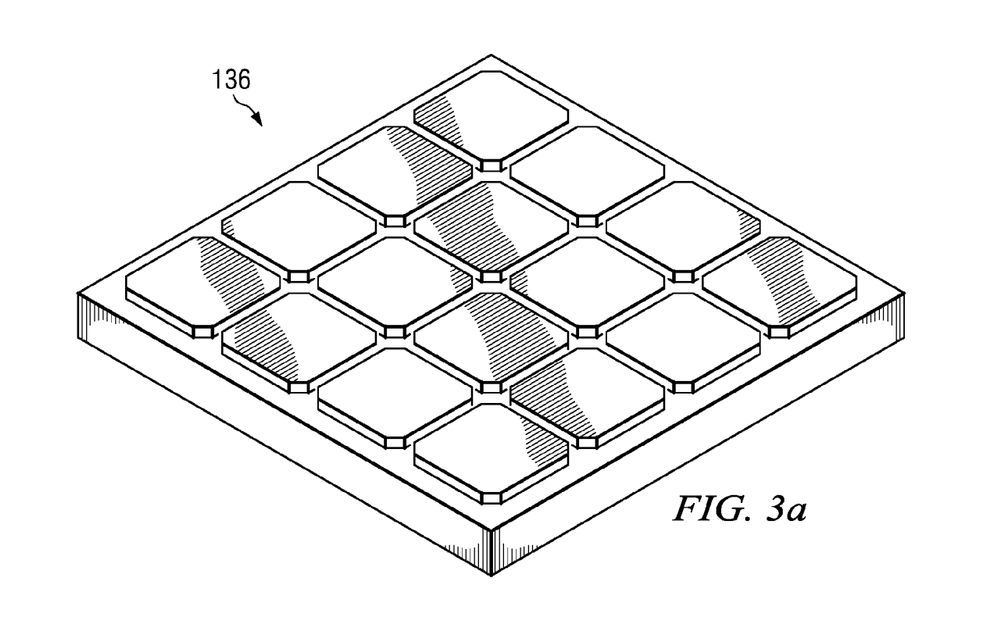
FIG. 3a demonstratively illustrates an exemplary spatial light modulator that can be used as the light valve in the integrated system illustrated in FIG. 1.

Referring to FIG. 3a, a perspective view of a portion of spatial light modulator 136 is illustrated therein. For simplicity purpose, only 4×4 pixels of the spatial light modulator are illustrated. However, the spatial light modulator may comprise any suitable number of pixels (referred to as "resolution"). For example, the spatial light modulator may have a resolution of 320×240 (Quarter-VGA), 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher. Of course, other resolutions are also applicable.

Figure 3B:
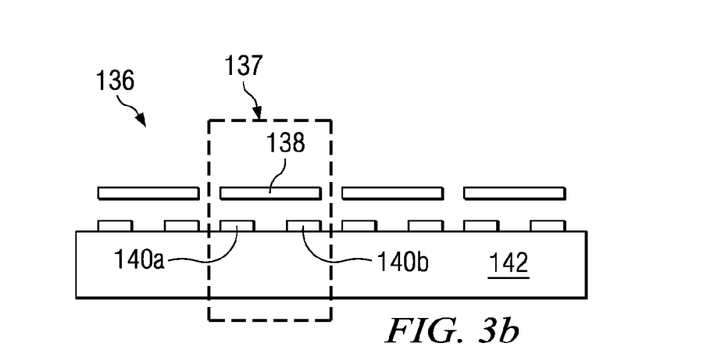

The pixels of the spatial light modulator as illustrated in FIG. 3a each comprise a deflectable and reflective mirror plate, which is better illustrated in FIG. 3b. Referring to FIG. 3b, spatial light modulator 136 comprises an array of micromirror devices, such as micromirror device 137. Each micromirror device comprises a reflective and movable mirror plate (e.g. mirror plate 138) held above substrate 142 (e.g. a standard semiconductor substrate) and addressing electrodes (e.g. addressing electrodes 140a and 140b) formed on substrate 142. The electrodes are associated with mirror plates such that electrostatic fields can be established between the mirror plates and the associated electrodes. In the presence of the electrostatic fields, electrostatic torque can be generated and applied to the movable mirror plate. With the electrostatic torque, the mirror plate is capable of rotating to different positions relative to substrate 142. The electronic voltages of the addressing electrodes can be set and controlled by electronic circuits connected to the addressing electrodes and formed on substrate 142. A typical electronic circuit can comprise a memory cell. For simplicity purpose, the electronic circuits are not shown in the figure. In one example, the mirror plate can be formed on substrate 142. Alternatively, the mirror plates can be formed on a separate substrate, such as a light transmissive substrate, than substrate 142 on which addressing electrodes are formed.

Figure 4:
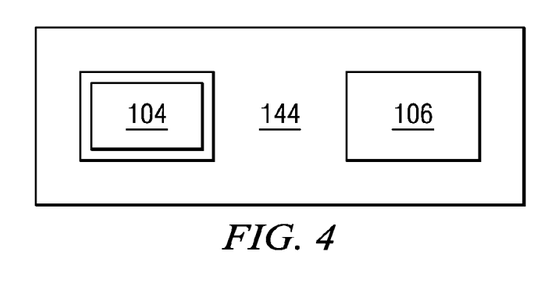
FIG. 4 demonstratively illustrates a top view of an exemplary layout of a light valve and an image sensor in a single package, which can be used in the integrated system in FIG. 1.

For improving the integration, the size, and/or cost of the system as discussed above with reference to FIG. 1, the image sensor and the light valve can be disposed in the same package, an example of which is schematically illustrated in FIG. 4. Referring to FIG. 4, a top view of an exemplary package in which the image sensor and the light valve are packaged is schematically illustrated therein. In this example, light valve 104 and image sensor 106 are disposed on a supporting surface of package substrate 144. The light valve and image sensor can be disposed such that the elongated edges or the short edges of rectangular shaped image sensors and light valves are substantially aligned along a virtual line as illustrated in the figure. This arrangement enables the smallest possible supporting surface and smallest possible package, which helps in reducing the size and cost of the package.

Figure 5:
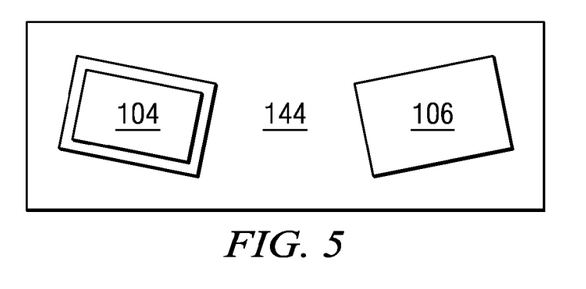
FIG. 5 demonstratively illustrates a top view of another exemplary layout of a light valve and an image sensor in a single package, which can be used in the integrated system in FIG. 1.

Alternatively, the image sensor (106) and light valve 104 can be rotated in the supporting surface of package substrate 144 in favor of other system configurations (e.g. optical coupling of the image sensor and/or light valve to other system components), as illustrated in FIG. 5.

Figure 6:
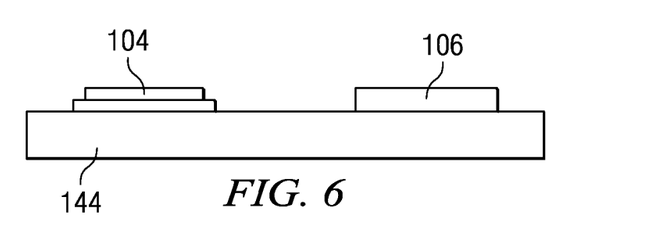
FIG. 6 demonstratively illustrates a cross-sectional view of an exemplary layout of a light valve and an image sensor in a single package, which can be used in the integrated system in FIG. 1.
Figure 7:
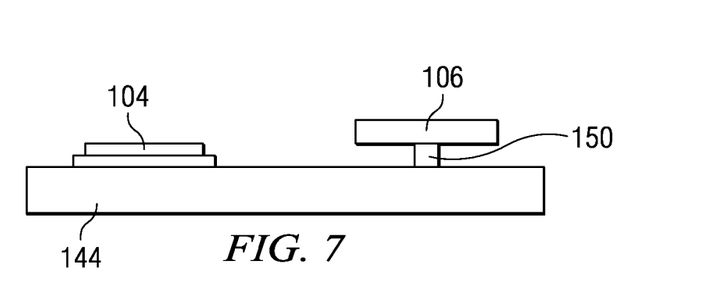
FIG. 7 demonstratively illustrates a cross-sectional view of another exemplary layout of a light valve and an image sensor in a single package, which can be used in the integrated system in FIG. 1.

The image sensor (106) and light valve 104 can alternatively be disposed on the supporting surface of package substrate 144 such that the pixel arrays of the light valve and image sensor are substantially that same plane parallel to package substrate 144, as schematically illustrated in FIG. 6. In other examples, the pixel arrays of the image sensor (106) and light valve (104) may be at different planes parallel to the supporting surface of package substrate to compensate for optical path lengths of the light from the light valve and/or the light onto the image sensor from the dual-function lens, as schematically illustrated in FIG. 7. Image sensor 106 can be attached to post 150 that is formed on substrate 144 such that the image sensor (106) is elevated from the substrate (144). Alternatively, the light valve (104) can be attached to a post so as to elevate the light valve above the substrate (104).

Figure 8:
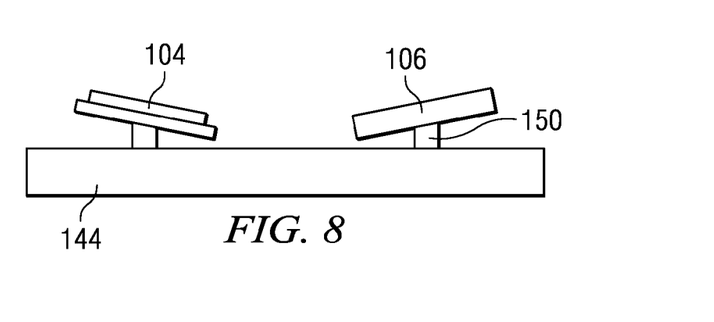
FIG. 8 demonstratively illustrates a cross-sectional view of yet another exemplary layout of a light valve and an image sensor in a single package, which can be used in the integrated system in FIG. 1.

At the raised positions, the image sensor and/or the light valve can be tilt relative to the supporting surface of the package substrate (144), as schematically illustrated in FIG. 8. This arrangement can be particularly useful for optically coupling the image sensor and/or the light valve to the dual-function lens; and the tilt angles of the image sensor and the light valve may or may not have the same absolute value.

In some examples, the integration of the integrated system as discussed above can be further improved by assembling the image sensor and/or the light valve (or the packaged light valve and/or image sensor) on the system board (e.g. electric circuit board) of the integrated system. In these examples, the package substrate can be attached to the system board, or alternatively, can be a portion of the system board. Assembling the light valve and/or the image sensor on the system board is more available when solid-state illuminators and diffractive optical components are employed; while less number of traditional non-diffractive optical lenses is employed in the integrated system.

In an alternative example, the light valve pixels and the image sensor pixels can be formed on the same substrate, such as a semiconductor substrate. In this instance, the image sensor pixel array and the light valve pixel array can be disposed on the supporting surface of the package substrate so as to be packaged together.

The performance of the integrated system can be improved by incorporating other features. For example, an optical path modulator can be employed for achieving a higher perceived resolution of displayed images than the resolution of the light valve used in the integrated system by causing the light from each light valve pixel shifting between multiple locations on the screen. When the shift period is equal to or lower than the flicker frequency of a viewer's eyes, the viewer will not be able to detect the shifting. Instead, the viewer's eyes perceive separate image pixels scanned by the light from single light valve pixel. This method enables utilization of light valves with a low resolution without substantially sacrificing the perceived image resolution. The optical path modulator can be a reflective mirror, a birefringent plate, or other suitable optical devices at the display axis between the light valve and the dual-function lens. Alternatively, the optical path modulator can be a moving mechanism capable of vibrating the light valve or other optical components that are disposed at the display axis between the light valve and the dual-function lens around the display axis. As a way of example, FIG. 9 schematically illustrates an exemplary integrated system with an optical path modulator.

Figure 9:
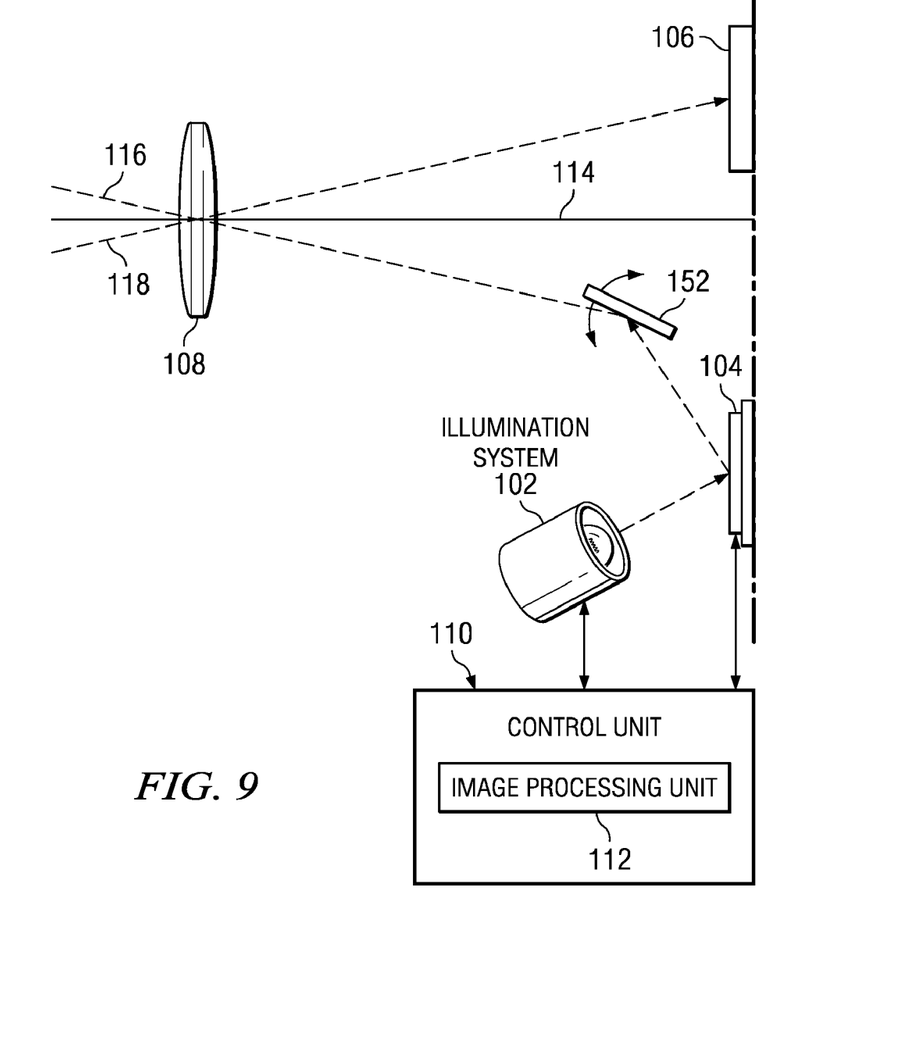
FIG. 9 schematically illustrates another exemplary integrated system with at least image capture and image projection capabilities, wherein the system is capable of projecting an image at a higher resolution with a light valve having a lower native resolution.

Referring to FIG. 9, different from that illustrated in FIG. 1, the integrated system schematically illustrated in FIG. 9 comprises a movable mirror (152) on the display optical axis 116 and between light valve 104 and dual-function lens 108. The mirror (152) can be driven by a driving mechanism (e.g. a step motor or a piezoelectric transducer) such that the reflective surface of the mirror (152) is capable of vibrating (by rotation) around a rotation axis that is non-parallel to the propagation path of the light incident thereto. As a consequence, the light incident thereto from each light valve pixel can be directed to different propagation paths.

It will be appreciated by those of skill in the art that a new and useful integrated system comprising image capture and image display functions has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A portable hand-held device with image capture and image projection functions, comprising:
   an optical element comprising a lens having a field of view and a principal optical axis;
   an image sensor comprising an array of pixels optically coupled to the optical element such that an image of an object can be captured by the image sensor through a first partial field of view of the optical element, the image sensor having a camera optical axis that is not coincident with the principal optical axis and being disposed in a first fixed position relative to and displaced from the principal optical axis;
   a light valve comprising an array of individually addressable pixels that are optically coupled to the optical element such that a light beam from each pixel can be projected on a screen by a second partial field of view of the optical element so as to form an image on the screen, the light valve having a projection optical axis that is not coincident with the principal optical axis and being disposed in second fixed position relative to and displaced from the principal optical axis.

2. The device of claim 1, wherein the image sensor and the light valve are disposed at either side of the principal optical axis of the optical element.

3. The device of claim 1, wherein the image sensor is a charge-coupled device or a CMOS imaging device.

4. The device of claim 1, wherein the light valve is a spatial light modulator or a self-light emitting panel.

5. The device of claim 1, wherein the light valve is a spatial light modulator; and wherein the system further comprises an illumination system providing illumination light for the spatial light modulator.

6. The device of claim 5, wherein the spatial light modulator comprises an array of deflectable micromirrors; and the illumination system comprises a solid-state illuminator.

7. The device of claim 6, wherein the illumination system further comprises a diffractive optical component for directing light from the solid-state illuminator onto the light valve pixels.

8. The device of claim 7, further comprising a holographic optical element interposed between the illumination system and the light valve pixels for optically coupling the light from the illumination system to the light valve pixels.

9. The device of claim 8, wherein the holographic optical element is assembled to the light valve.

10. The device of claim 1, wherein the light valve and image sensor are assembled to a same printed circuit board.

11. The device of claim 1, wherein the device is a phone, a computer, or a camera.

12. The device of claim 1, wherein a line connecting a geometric center of the image sensor pixel array, a geometric center of the light valve pixel array, and a geometric center of the optical element lens forms a triangle.

13. A portable hand-held device with image capture and image projection functions, comprising:

a dual function lens that can be operated as an object lens for an image capture function and as a projection lens for an image display function, the lens having a field of view and a principal axis;

an image sensor for image capture, the image sensor having a camera optical axis not coincident with the principal axis;

a spatial light modulator for image display, the spatial light modulator having a projection optical axis not coincident with the principal axis;

the image sensor and spatial light modulator being disposed on opposite sides of the principal axis in fixed positions relative to the lens, whereby different parts of the field of view of the lens are used for capturing an image in the image capture and for displaying an image in the image display function.

14. The device of claim 13, wherein a line connecting geometric centers of the lens, the image sensor and the spatial light modulator defines a triangle.

15. The device of claim 14, wherein the spatial light modulator includes an array of micromirrors.

16. The device of claim 15, wherein the device is a phone.

* * * * *